US009672499B2

(12) United States Patent
Yang et al.

(10) Patent No.: US 9,672,499 B2
(45) Date of Patent: Jun. 6, 2017

(54) DATA ANALYTIC AND SECURITY MECHANISM FOR IMPLEMENTING A HOT WALLET SERVICE

(71) Applicant: Modernity Financial Holdings, Ltd., Palo Alto, CA (US)

(72) Inventors: Danny Yang, Palo Alto, CA (US); Liqin Kou, Palo Alto, CA (US); Alex Liu, Shanghai (CN)

(73) Assignee: MODERNITY FINANCIAL HOLDINGS, LTD., Palo Alto, CA (US)

( * ) Notice: Subject to any disclaimer, the term of this patent is extended or adjusted under 35 U.S.C. 154(b) by 558 days.

(21) Appl. No.: 14/256,725

(22) Filed: Apr. 18, 2014

(65) Prior Publication Data

US 2015/0287026 A1 Oct. 8, 2015

Related U.S. Application Data

(60) Provisional application No. 61/974,415, filed on Apr. 2, 2014.

(51) Int. Cl.
*G06Q 20/00* (2012.01)
*G06Q 20/06* (2012.01)
(Continued)

(52) U.S. Cl.
CPC ........... *G06Q 20/065* (2013.01); *G06Q 20/06* (2013.01); *G06Q 20/3678* (2013.01); *G06Q 20/3825* (2013.01); *G06Q 20/3829* (2013.01)

(58) Field of Classification Search
CPC ........... G06Q 20/3678; G06Q 20/3825; G06Q 20/3829; G06Q 20/06
(Continued)

(56) References Cited

U.S. PATENT DOCUMENTS

2014/0244506 A1* 8/2014 Gramling ............... G06Q 20/40
                                                             705/44
2015/0262137 A1 9/2015 Armstrong et al.
(Continued)

FOREIGN PATENT DOCUMENTS

WO 2015142765 A1 9/2015

OTHER PUBLICATIONS

Brito, J., & Castillo, A. M. (2016). Bitcoin: a primer for policymakers. Arlington, VA: Mercatus Center, George Mason University.*

*Primary Examiner* — Calvin L Hewitt, II
*Assistant Examiner* — Dennis Keritsis
(74) *Attorney, Agent, or Firm* — Perkins Coie LLP (57) ABSTRACT

Some embodiments include a hot wallet service system including: a manager server configured to receive a cryptocurrency transaction request identifying at least a hot wallet accountholder identifier and to determine a first set of authentication servers to authenticate the cryptocurrency transaction request; the authentication servers, each configured to independently authenticate the cryptocurrency transaction request by verifying a requester of the cryptocurrency transaction request against an accountholder profile associated with the hot wallet accountholder identifier; wherein the authentication servers are configured to approve, independently from each other, the cryptocurrency transaction request by cryptographically signing approval messages to send to an aggregation server using respective private authentication keys stored respectively in the authentication servers when the requester is verified; and the aggregation server configured to aggregate cryptographic signatures of the cryptocurrency transaction request from the authentication servers to publish the cryptocurrency transaction request into a cryptocurrency network.

17 Claims, 6 Drawing Sheets

(51) Int. Cl.
*G06Q 20/36* (2012.01)
*G06Q 20/38* (2012.01)

(58) Field of Classification Search
USPC .............................................. 705/64, 65, 69
See application file for complete search history.

(56) References Cited

U.S. PATENT DOCUMENTS

| | | |
|---|---|---|
| 2015/0262138 A1 | 9/2015 | Hudon et al. |
| 2015/0262139 A1 | 9/2015 | Shtylman et al. |
| 2015/0262140 A1 | 9/2015 | Armstrong et al. |
| 2015/0262141 A1 | 9/2015 | Rebernik et al. |
| 2015/0262168 A1 | 9/2015 | Armstrong et al. |
| 2015/0262171 A1 | 9/2015 | Langschaedel et al. |
| 2015/0262172 A1 | 9/2015 | Rebernik et al. |
| 2015/0262176 A1 | 9/2015 | Langschaedel et al. |

* cited by examiner

DATA ANALYTIC AND SECURITY MECHANISM FOR IMPLEMENTING A HOT WALLET SERVICE

CROSS-REFERENCE TO RELATED APPLICATION(S)

This application claims the benefit of U.S. Provisional Patent Application No. 61/974,415, entitled "DATA ANALYTIC AND SECURITY MECHANISM FOR IMPLEMENTING A HOT WALLET SERVICE," filed on Apr. 2, 2014, which is incorporated by reference herein in its entirety.

RELATED FIELD

At least one embodiment of this disclosure relates generally to providing virtual currency wallet services, and in particular to providing security mechanisms to protect cryptocurrency exchanges.

BACKGROUND

Unconventional currency systems, such as virtual currency, cryptocurrency, and other peer-to-peer payment systems, enable higher anonymity of financial transactions, more flexibility in types of financial transactions, and better protection of user privacy. However, these inherent properties of the currency systems also present challenges to the systems and services that attempt to protect the users of these currency systems from exploits and other fraudulent activities.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

A "virtual currency" herein refers to a medium of exchange that is electronically created and stored. A "cryptocurrency" is a type of virtual currency. Cryptocurrency, such as Bitcoin, refers to a digital medium of exchange that uses cryptography for security and prevention of counterfeiting and/or fraud. Cryptocurrency can be implemented in a distributed manner across a network of computing devices that maintains a digital banking ledger, such as in the form of a block chain. The block chain is a shared public ledger on which the cryptocurrency network relies. All confirmed financial transactions using the cryptocurrency are included in the block chain. The integrity and the chronological order of the block chain are enforced with cryptography.

A financial transaction can occur between cryptocurrency wallets. When the financial transaction is initiated, it is propagated through the cryptocurrency network and eventually incorporated in a block of the block chain by a miner entity in the cryptocurrency network.

A "hot wallet" or a "hot wallet service" herein refers to implementation of a virtual currency wallet that is accessible online via the Internet, providing users a portal to initiate financial transactions within a virtual currency economy. For example, Bitcoin-related services and exchanges that are able to pay out withdrawals instantly can be said to be paying them from a "hot wallet service." The hot wallet service can be implemented by one or more computer servers storing one or more private keys that can authorize financial transactions to a cryptocurrency network.

"Mining" herein refers to a distributed consensus system in a cryptocurrency network that is used to confirm waiting transactions by including them in the block chain. The process of mining enforces a chronological order in the block chain, protects the neutrality of the cryptocurrency network, and allows different computers to agree on the state of the cryptocurrency system. To be confirmed, transactions must be packed in a block that fits very strict cryptographic rules that will be verified by the cryptocurrency network. These rules prevent previous blocks from being modified because doing so would invalidate all following blocks. Mining also creates the equivalent of a competitive lottery that prevents any individual from easily adding new blocks consecutively in the block chain. This way, no individuals can control what is included in the block chain or replace parts of the block chain to roll back their own spends. "Miner" herein refers to an entity that participates in the mining activity by attempting to cryptographically solve a computational challenge required to generate a new block.

This disclosure involves mechanisms of performing big data analytics on cryptocurrency user profiles in order to provide secure transaction through a private hot wallet service. The private hot wallet service is implemented by a network of authentication factor-specific servers working independently of one another to verify a user's identify in every transaction.

Figure 1:
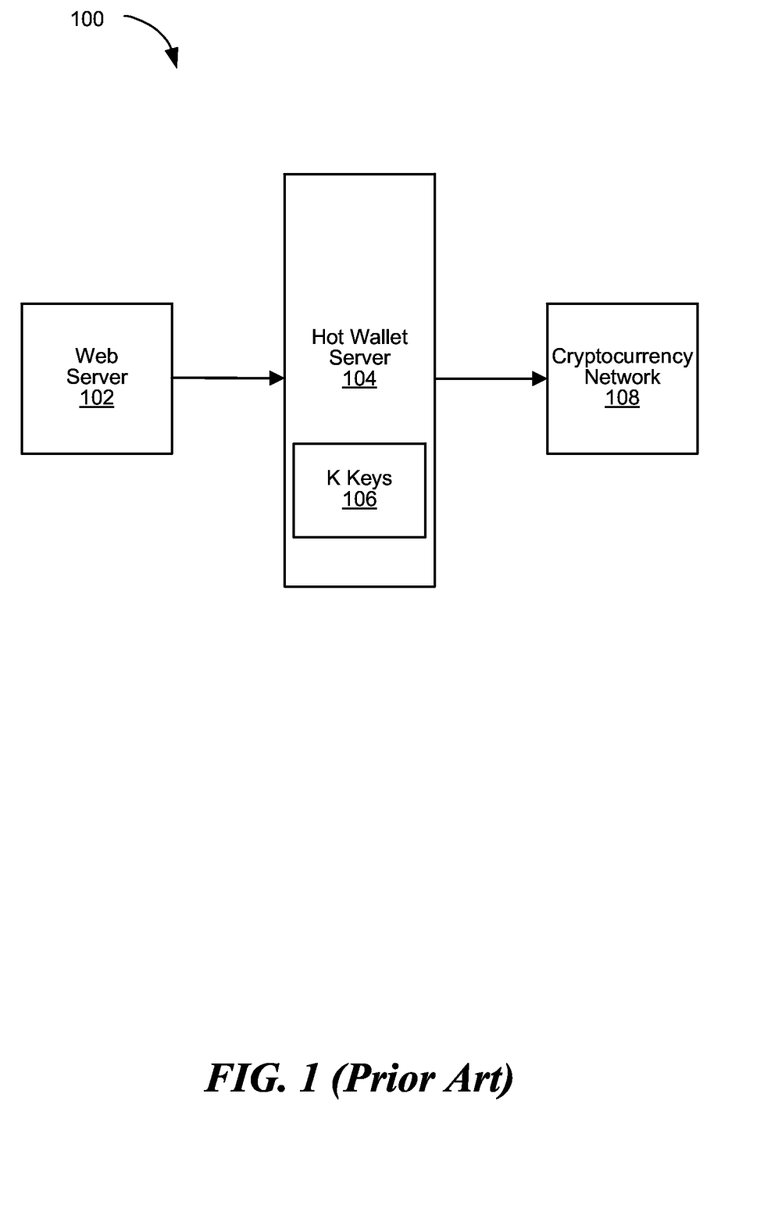
FIG. 1 illustrates a conventional system architecture to implement a hot wallet service.

FIG. 1 illustrates a conventional system architecture to implement a conventional hot wallet service 100. The conventional hot wallet service 100 is implemented via a web server 102 that provides a user interface via browser-based webpages to initiate financial transactions involving virtual currencies. The web server 102 has access to a hot wallet server 104 storing cryptographic private keys 106 that enables the conventional hot wallet service 100 to digitally sign and authorize the financial transactions. Once the financial transactions are digitally signed using the cryptographic private keys 106, the financial transactions are propagated into a cryptocurrency network 108 where the financial transactions eventually become part of the public shared ledger as described above. For example, a cryptocurrency miner who has gained the privilege of establishing a next block in the block chain maintained by the cryptocurrency network 108 can verify the digital signature provided by the hot wallet server 104. For example, the digital signature can be verify using a public key corresponding to one of the cryptographic private keys 106 available on the cryptocurrency network 108.

The conventional hot wallet service 100 has several security weak points that may be exploited by an unauthorized party. For example, verification of an end-user occurs in a single bottlenecked system, such as the web server 102 or the hot wallet server 104. The linear architecture of the conventional hot wallet service 100 also increases the likelihood of spoofing attacks and unauthorized interceptions of messages.

Figure 2:
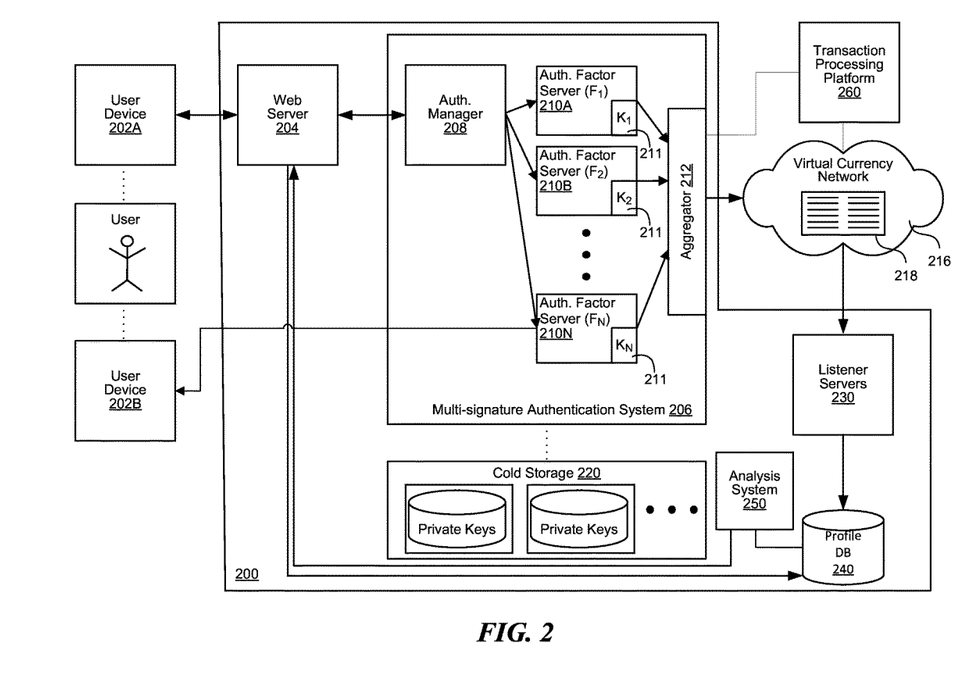
FIG. 2 is an example of a system architecture to implement a hot wallet service, in accordance with various embodiments.

FIG. 2 is an example of a system architecture to implement a hot wallet service 200, in accordance with various embodiments. A user can access the hot wallet service 200 via one of its user devices (e.g., a user device 202A). The user device 202A can be a mobile device, such as a tablet, a smart phone, or a laptop computer, a desktop computer, a gaming console, a virtual machine, or any other computing devices. Financial services (e.g., withdrawal or transfer) can be provided by a web server 204 or a combination of the Web server 204 and an agent application running on the user device 202A. For example, the agent application can be a mobile application, a flash application, or a desktop application in communication with the Web server 204. The financial services are accessible to the user through a user interface implemented either via the agent application or webpages generated from the Web server 204. For example, the user can initiate or respond to a financial transaction through the user interface.

To process the financial transaction, the hot wallet service 200 can pipe the financial transaction through a multi-signature authentication system 206. The multi-signature authentication system 206 includes at least an authenticator manager 208, multiple authentication factor servers 210 (e.g., an authentication factor server 210A, an authentication factor server 210B, and other servers including an authentication factor server 210N, collectively the "multiple authentication factor servers 210"), and a signature aggregator 212. The authenticator manager 208 determines which of the multiple authentication factor servers 210 need to be called in order to authenticate a financial transaction by an end-user. The authenticator manager 208 can, for example, store the public keys associated with a user wallet profile (e.g., a user's virtual currency account). The number of the multiple authentication factor servers 210 can be denoted as an integer "N". In some embodiments, the authenticator manager 208 can associate a user wallet profile with a first set of authentication factor servers. In other embodiments, every user wallet profile managed by the hot wallet service 200 can potentially engage with all of the multiple authentication factor servers 210. That is, the first set can include a subset of the multiple authentication factor servers 210 or all of the multiple authentication factor servers 210. The number of the first set of authentication factor servers can be denoted as an integer "K", where $K \leq N$.

The authenticator manager 208 can store a policy configuration. The policy configuration can be used to select an engagement set of authentication factor servers from the first set of the authentication factor servers based on attributes of the user wallet profile, the user device 202A, the financial transaction (e.g., amount and the destination wallet account) in question, or any combination thereof. The number of the engagement set of the authentication factor servers can be denoted as an integer "E", where $E \leq K$. For example, the policy configuration can remove a device authentication factor when the device associated with the device authentication factor is being used to log into the Web server 204 (e.g., because there is increased risk factor associated therewith). For another example, the policy configuration can increase the number of the selected authentication factor servers when the amount of the financial transaction is high or when the destination wallet account is classified as "suspicious."

In some embodiments, the authenticator manager 208 can be implemented by multiple servers. In these embodiments, each authenticator manager server can function independently of each other to provide further security. For example, different authenticator manager servers can manage different subsets of the user pool using the hot wallet service 200. For another example, financial transactions can be arbitrarily assigned to different authenticator manager servers.

The multiple authentication factor servers 210 authenticate financial transactions independent of one another. Each authentication factor server associated with a user wallet profile stores one or more private keys 211 for the user wallet profile. In the illustrated embodiment, each authentication factor server stores one of the private keys 211 for each user wallet profile. Each authentication factor server independently authenticates the user before authorizing the financial transaction with a digital signature generated based on their respective private keys 211.

Each of the multiple authentication factor servers 210 is associated with an authentication mechanism. Each authentication mechanism can be different from one another. For example, the authentication mechanism can be one of possession-based authentication mechanisms (e.g., by checking whether or not the user is in possession of a device or item), knowledge-based authentication mechanisms (e.g., by checking whether or not the user knows of one or more passcodes, patterns, answers, associations or other units of knowledge), or inherence-based authentication mechanisms (e.g., by identifying the user with a known characteristic of the user, such as a vocal profile, a fingerprint, an iris pattern, or other biometrics). In various embodiments, the authenticator manager 208 can select the engagement set of the authentication factor servers based on the types of the authentication mechanism used. For example, the authenticator manager 208 can ensure that at least two categories (e.g., the knowledge-based category, the possession-based category, or the inherence-based category) of the authentication mechanisms are used.

Each authentication factor server of the engagement set can independently reach out to the user to authenticate the user. For example, the authentication factor server 210N can implement a possession-based authentication mechanism that verifies that the user has possession of a device, such as the user device 202B as shown. Some or all of the authentication factor servers can remain transparent to the user and the user's devices. Some or all of the authentication factor servers can output verification requests to the user and receive verifying tokens from the user through the agent application or the Web server 204 (e.g., where the authentication factor server 210N can indirectly receive a verifying input from the user). For example, the authentication factor server 210N can transmit a short message service (SMS) message containing a verification code to the user device 202B. The user, upon reading the SMS message, can input the verification code as a verifying token through the user interface provided by the agent application or the Web server 204. The Web server 204 can then pass this information to the authentication factor server 210N.

In some embodiments, the authenticator manager 208 may require that multiple users need to authorize the financial transaction and thus multiple users need to be authenticated. In some embodiments, each authentication factor server can independently verify two or more of the multiple users. In other embodiments, each authentication factor server is assigned to verify one of the multiple users.

Some of the multiple authentication factor servers 210 may work with external authentication systems outside of the multi-signature authentication system 206. For example, an authentication factor server can request an external service (e.g., a Google™ authenticator service or another mobile device authentication service) to verify the identity of a user operating the user device 202A that initiated the financial transaction in question.

In various embodiments, access privileges of the administrators of the multiple authentication factor servers 210 are managed in such a way that no single administrator account of the multi-signature authentication system 206 can access all of the multiple authentication factor servers 210. This feature advantageously prevents security bottlenecks where one of the administrator can potentially be compromised. In some embodiments, an administrator account must be authenticated via multiple authentication mechanisms in order to access one of the multiple authentication factor servers 210 that is storing the private keys 211.

The signature aggregator 212 receives digital signatures for the financial transaction from the authentication factor servers in the engagement set. The signature aggregator 212 can aggregate the digital signatures and generate one or more on-block public signatures to propagate into a virtual currency network 216, such as a cryptocurrency network, along with the financial transaction. For example, the on-block public signatures can be a hash or a mathematical aggregate calculated based on the digital signatures provided by the authentication factor servers in the engagement set. In various embodiments, the multi-signature authentication system 206 is an "off-the-block-chain" authentication system where authentication of one or more users who initiate a financial transaction occurs outside of the virtual currency network 216. The multi-signature authentication system 206 is also compatible with multi-signature on-block authentication mechanisms. That is, the signature aggregator 212 can generate multiple on-block public signatures when propagating the financial transaction into the virtual currency network 216.

When propagating the financial transaction from the multi-signature authentication system 206, any data or metadata identifying the user that initiated the financial transaction can be stricken away or obfuscated to protect the privacy of the user. Once the financial transaction is propagated through the virtual currency network 216, the financial transaction can be eventually incorporated into a public shared ledger 218 (e.g., a block chain as described above) by a miner entity of the virtual currency network 216.

In some embodiments, the signature aggregator 212 includes a policy configuration consistent with the policy configuration in the authenticator manager 208. The policy configuration can be used to determine whether only a threshold subset of the selected engagement set of the authentication factor servers need to sign before authenticating the financial transaction. The number of the threshold subset can be denoted as an integer "M" where M≤E. For example, where M is 3 and E is 5, the user can engage with five of the authentication factor servers and fail two of the authentication tests by the five authentication factor servers, and still the financial transaction initiated by the user can be authenticated by the multi-signature authentication system 206. In these embodiments, the same public on-block signatures can be generated based on different subsets of the digital signatures from the engagement set of the authentication factor servers as long as the subset includes M or more of the total number of digital signatures.

In some embodiments, the signature aggregator 212 can be implemented by multiple servers. In these embodiments, each the signature aggregator server can function independently of each other to provide further security. For example, different the signature aggregator servers can manage different subsets of the user pool using the hot wallet service 200. For another example, financial transactions can be arbitrarily assigned to different signature aggregator servers.

The multi-signature authentication system 206 of the hot wallet service 200 can support at least two different ways of storing cryptocurrency for the user, such as via an "on the block chain mechanism" or an "off the block chain mechanism." For the "off the block chain mechanism," the hot wallet service 200 stores cryptocurrency of all of its users in a common pool that the multi-signature authentication system 206 manages. The multi-signature authentication system 206 can process financial transactions (e.g., deposits and withdrawals) for all users using the same common pool of cryptocurrency addresses (and private keys). Cryptocurrency addresses can be a hash of public keys corresponding to the private keys maintained and secured by the multi-signature authentication system 206. In this case, the cryptocurrency addresses and the private keys are "shared" or "mixed" for the users. A specific user's balances are tracked "off the block chain" away from the virtual currency network 216.

To implement the "on the block chain mechanism," each user of the hot wallet service 200 is given a specific set of cryptocurrency addresses (and corresponding private keys), so there is no sharing amongst the users. Each user can track his/her balances either via the Web server 204 or utilizing corresponding public keys of his/her cryptocurrency addresses on the public shared ledger 218 (e.g., the public block chain).

The system architecture of the hot wallet service 200 can also include an off-line cold storage 220 storing backups of the private keys 211. The cold storage is a reserve of virtual currencies that are off-line. The ability to transact in cryptocurrency may be protected by protecting the private keys 211. To minimize the possibility that an intruder can steal an entire reserve of cryptocurrency or a failure of the authentication factor servers (e.g., thus potentially destroying part of the cryptocurrency pool), an operator of the hot wallet service 200 can keep the majority or at least a portion of the reserve in the cold storage 220. The amount of cryptocurrency kept by the multiple authentication factor servers 210 is represented by how many of the private keys 211 are stored in the multiple authentication factor servers 210. The multi-signature authentication system 206 can automatically determine how many of the private keys 211 to store in the multiple authentication factor servers 210 to balance the amount needed to cover anticipated withdrawals and financial transactions through the hot wallet service 200. In other embodiments, an operator of the multi-signature authentication system 206 can manually determine how many of the private keys 211 to store in the multiple authentication factor servers 210.

In various embodiments, the cold storage 220 can also include multiple, separate storage devices, wherein different storage devices store different private keys associated with a single user wallet profile. For example, the cold storage 220 can be divided in the same way as the multiple authentication factor servers 210, where each authentication factor server corresponds to a cold storage device. In some embodiments, the multiple storage devices can be co-located. In other embodiments, for improved security, the multiple storage devices are placed in different locations such that discovery or loss of possession of one set of the multiple storage devices would not compromise the entire virtual currency pool.

To further improve the security provided by the hot wallet service 200, the hot wallet service 200 may include multiple listener servers 230 connected to the virtual currency network 216 in different geographical locations. The listener servers 230 can monitor financial transactions (e.g., pending or part of the public shared ledger 218) within the virtual currency network 216. Attributes, information, and metadata related to the monitored financial transactions can be stored in a profile database 240. The profile database 240 can be implemented by a computer system, such as the computer system 400 of FIG. 4. The profile database 240 can be implemented by multiple computer servers. In embodiments, the profile database 240 can collect or have references to public databases (e.g., criminal records, consumer records, geolocation records, tax records, etc.). The Web server 204 can also store know-your-customer (KYC) information in the profile database 240.

An analysis system 250 performs the data analytics from the data in the profile database 240 to identify and classify suspicious financial transactions and user wallet profiles (e.g., represented by the public key or a hash of the public key of that user wallet profile). For example, the analysis system 250 can identify suspicious financial transactions and wallet profiles based on user activity patterns, financial analysis patterns, fraud detection patterns, or any combination thereof. The analysis system 250 can further utilize the relevant information from the clients of the hot wallet service 200 to determine KYC and anti-money laundering (AML) regulation compliance. In some embodiments, instead of discrete classification of wallet profiles based on level of suspicion, the analysis system 250 can also generate a credit rating or score for each wallet profile based on the data in the profile database 240.

The analysis system 250 can share the classifications and/or credit scores of the financial transactions and/or the wallet profiles with the Web server 204. The Web server 204 can automatically prevent certain financial transactions to be processed by the multi-signature authentication system 206. The Web server 204 can also present the suspicion classifications or credit ratings/scores of wallet profiles to its clients/users to enable the users to make a decision of whether to initiate or complete a financial transaction.

In some embodiments, the analysis system 250 can share the classifications and/or credit scores of the financial transactions and/or the wallet profiles with external systems, such as large miner pools of the virtual currency network 216 or associated partners in the ecosystem of the virtual currency network 216, including other hot wallet services and authentication services.

In some embodiments, the system architecture of the hot wallet service 200 can include a transaction processing platform 260 that enables high-frequency-capable trading of virtual currency in the virtual currency network 216. The transaction processing platform 260 can utilize a market clearing algorithm, such as a greedy algorithm or a matching algorithm. The market clearing algorithm can be divisible or indivisible. Unlike traditional market clearing algorithms for stocks, the market clearing algorithm for the virtual currency can be configured to support partial units of the virtual currency (e.g., down to eight decimals of partial units). The market clearing algorithms can ensure precisions of the financial transactions such that no fractional amount of virtual currency is lost and no fiat currency is lost (e.g., when the transaction processing platform 260 is matching trades between virtual currency and fiat currency) in any financial transaction through the system due to rounding. This feature can be critical since the smallest unit of a virtual currency is usually much smaller than the smallest unit of fiat currency.

Regarding FIG. 2, functionalities implemented in the hot wallet service 200 including the described servers, components and/or applications associated with the hot wallet service 200 may each be implemented in the form of one or more appropriately programmed programmable processors, in the form of special-purpose circuitry, or a combination thereof. System architecture described herein can include additional, fewer, or different modules/servers/components for various applications.

For example, the functionalities described can be implemented as instructions within modules on a tangible storage memory capable of being executed by a processor or a controller. Tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable gate array, a network capable computing device, a virtual machine, a distributed operating system, or any combination thereof. Memory spaces and storages described in the figures can be also implemented with tangible storage memory.

In some cases, some of the servers described may operate individually and independently of other servers. Some or all of the servers may be implemented on the same host device (e.g., as virtual servers) or on separate devices. The separate devices can be coupled together through one or more communication channels (e.g., wireless or wired channel) to coordinate their operations. Some or all of the servers may be combined as one server. A single server may be divided into sub-server, each sub-server performing separate method step or method steps of the single server. In some embodiments, at least some of the servers share access to a memory space. For example, one server may access data accessed by or transformed by another server. The servers may be considered "coupled" to one another if they share a physical connection or a virtual connection, directly or indirectly, allowing data accessed or modified from one server to be accessed in another server.

Figure 3:
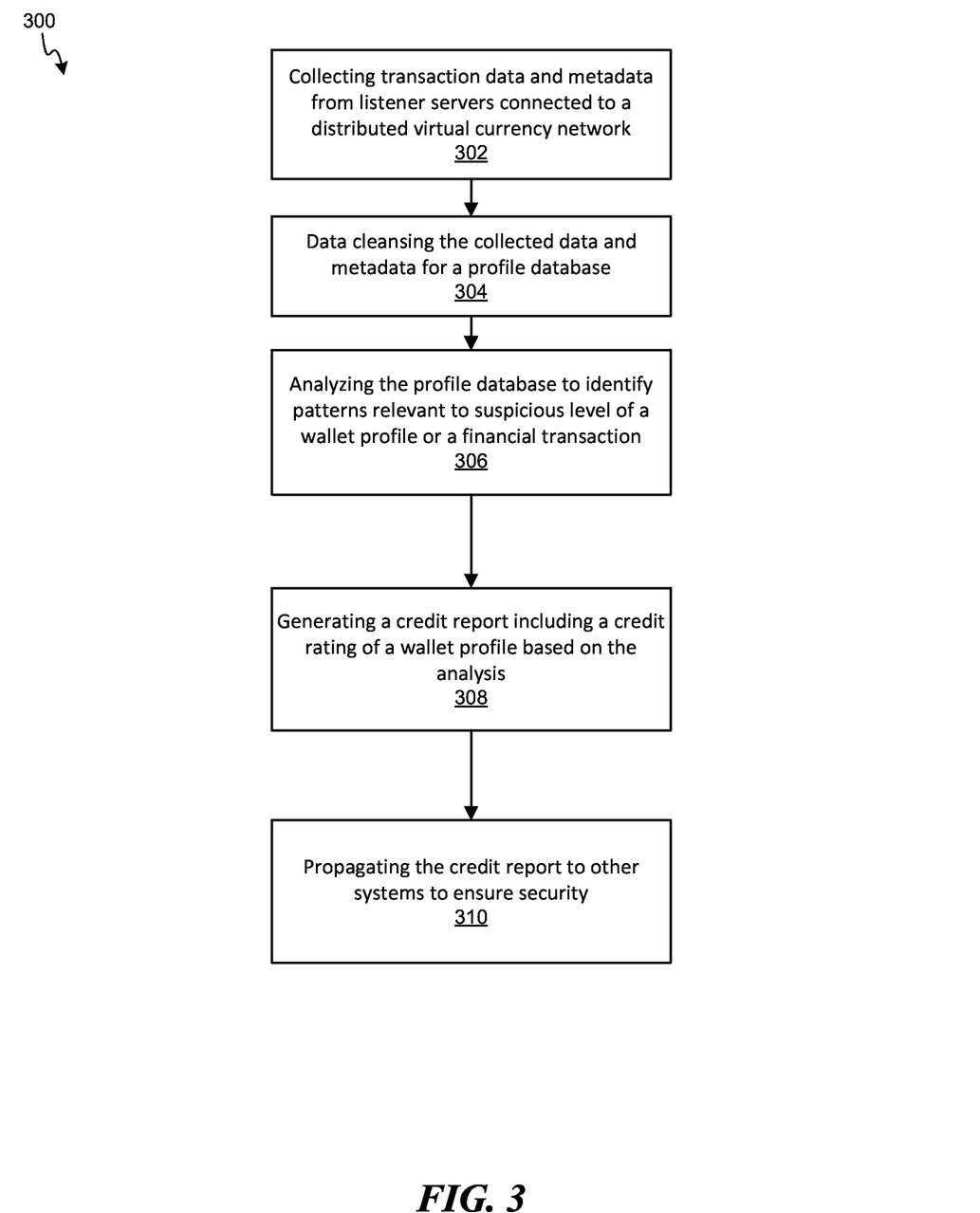
FIG. 3 is a flow chart of a method of analyzing wallet profiles in a virtual currency network, in accordance with various embodiments.

FIG. 3 is a flow chart of a method 300 of analyzing wallet profiles in a virtual currency network, in accordance with various embodiments. The method 300 includes collecting transaction data and metadata from listener servers connected to a distributed virtual currency network (e.g., a cryptocurrency network such as Bitcoin) in step 302. The transaction data and metadata can be organized by wallet identifiers or profiles, such as a public key of the wallet or a hash of the public key. The listener servers can be geographically distributed to cover computing nodes within the virtual currency network such that a pending financial transaction can be captured before it is written into the public shared ledger of the virtual currency network. Step 302 can also include collecting KYC data and metadata from a Web server that provides a user interface for a hot wallet service connected to the virtual currency network. Step 302 can further include collecting public data and metadata from government record sources and other public record sources.

The method 300 can then include data cleansing the collected data and metadata in step 304. Data cleansing can include data normalization, day deduplication, and otherwise formatting all of the collected data in accordance with a date layout configuration of a profile database. Data cleansing may also include other extract, transform, and load (ETL) processes.

Then in step 306, an analysis server system analyzes the profile database to identify patterns relevant to a suspicious level of a wallet profile or a financial transaction. For example the analysis server system can utilize machine learning algorithms (e.g., clustering, pattern recognition, classification algorithms, etc.) to categorize the suspicion levels of each wallet profile or financial transaction. In step 308, the analysis server system generates a credit report including a credit rating of a wallet profile based on the analysis performed in step 306. The analysis server system can then propagate, in step 310, the credit report to the users of the hot wallet service, an external authentication system, other hot wallet services, crypto-currency mining services, or any combination thereof.

Figure 4:
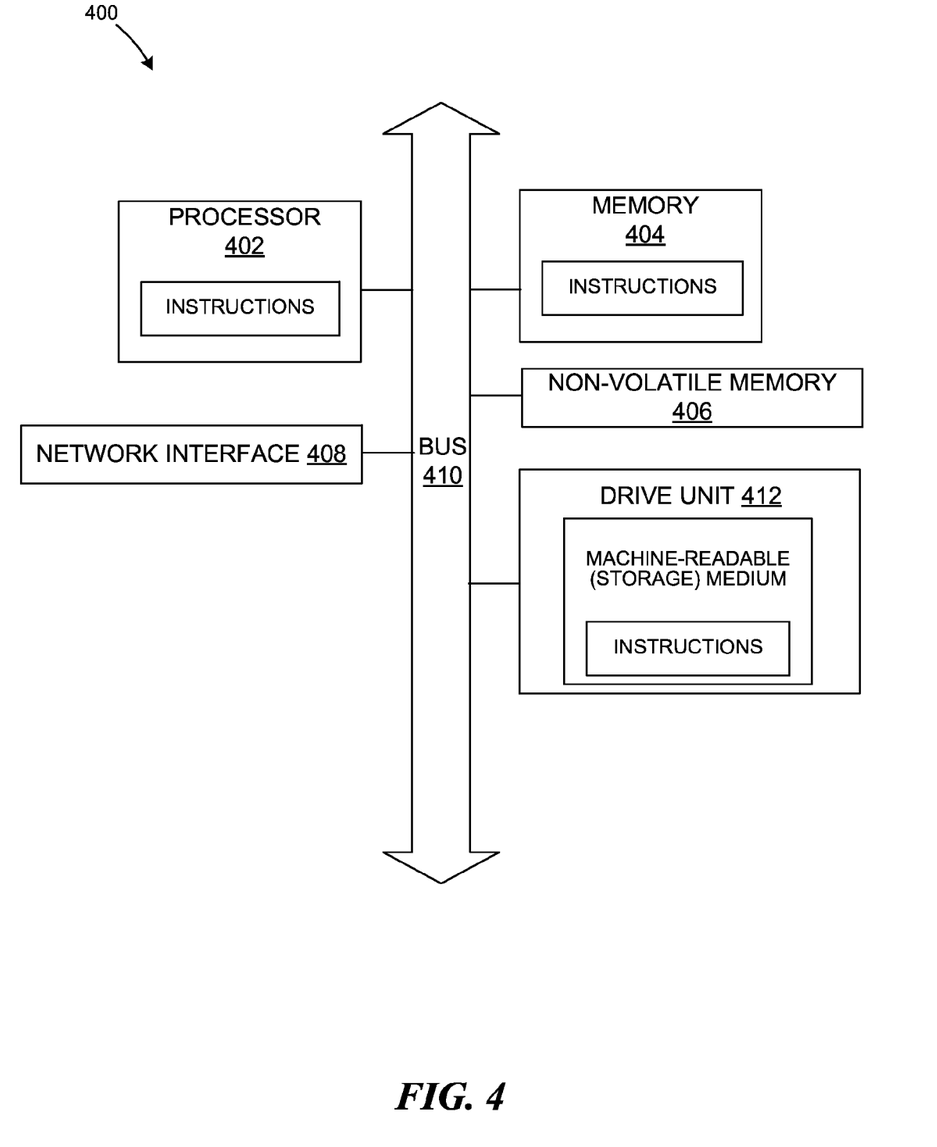
FIG. 4 is a diagrammatic representation of a machine in the example form of a computer system within which a set of instructions, for causing the machine to perform any one or more of the methodologies or modules discussed herein, may be executed.

FIG. 4 is a block schematic diagram that depicts a machine in the exemplary form of a computer system 400, within which a set of instructions for causing the machine to perform any of the herein disclosed methodologies may be executed. For example, the computer system 400 can be the user device 202A, any of the servers in the multi-signature authentication system 206, or any other servers in the system architecture of the hot wallet service 200 of FIG. 2. The computer system 400 is intended to illustrate a hardware device on which any of the instructions, processes, modules and components depicted in the figures above (and any other processes, techniques, modules and/or components described in this specification) can be implemented. As shown, the computer system 400 includes a processor 402, memory 404, non-volatile memory 406, and a network interface 408. Various common components (e.g., cache memory) are omitted for illustrative simplicity. The computer system 400 can be of any applicable known or convenient type, e.g., a personal computer (PC), server-class computer or mobile device (e.g., smartphone, card reader, tablet computer, etc.). In some embodiments, the computer system 400 may include a network router, a network switch, a network bridge, a Web appliance or any machine capable of executing or transmitting a sequence of instructions that specify actions to be taken. The components of the computer system 400 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 402. The memory 404 is coupled to the processor 402 by, for example, a bus 410. The memory 404 can include, by way of example but not limitation, random access memory (RAM), e.g., dynamic RAM (DRAM) and static RAM (SRAM). The memory 404 can be local, remote, or distributed.

The bus 410 also couples the processor 402 to the non-volatile memory 406 and drive unit 412. The non-volatile memory 406 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 406 can be local, remote, or distributed.

The data structures, modules, and instruction steps described in the figures above may be stored in the non-volatile memory 406, the drive unit 412, or the memory 404. The processor 402 may execute one or more of the modules stored in the memory components.

The bus 410 also couples the processor 402 to the network interface 408. The network interface 408 can include one or more of a modem or network interface. A modem or network interface can be considered to be part of the computer system 400. The network interface 408 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Figure 5:
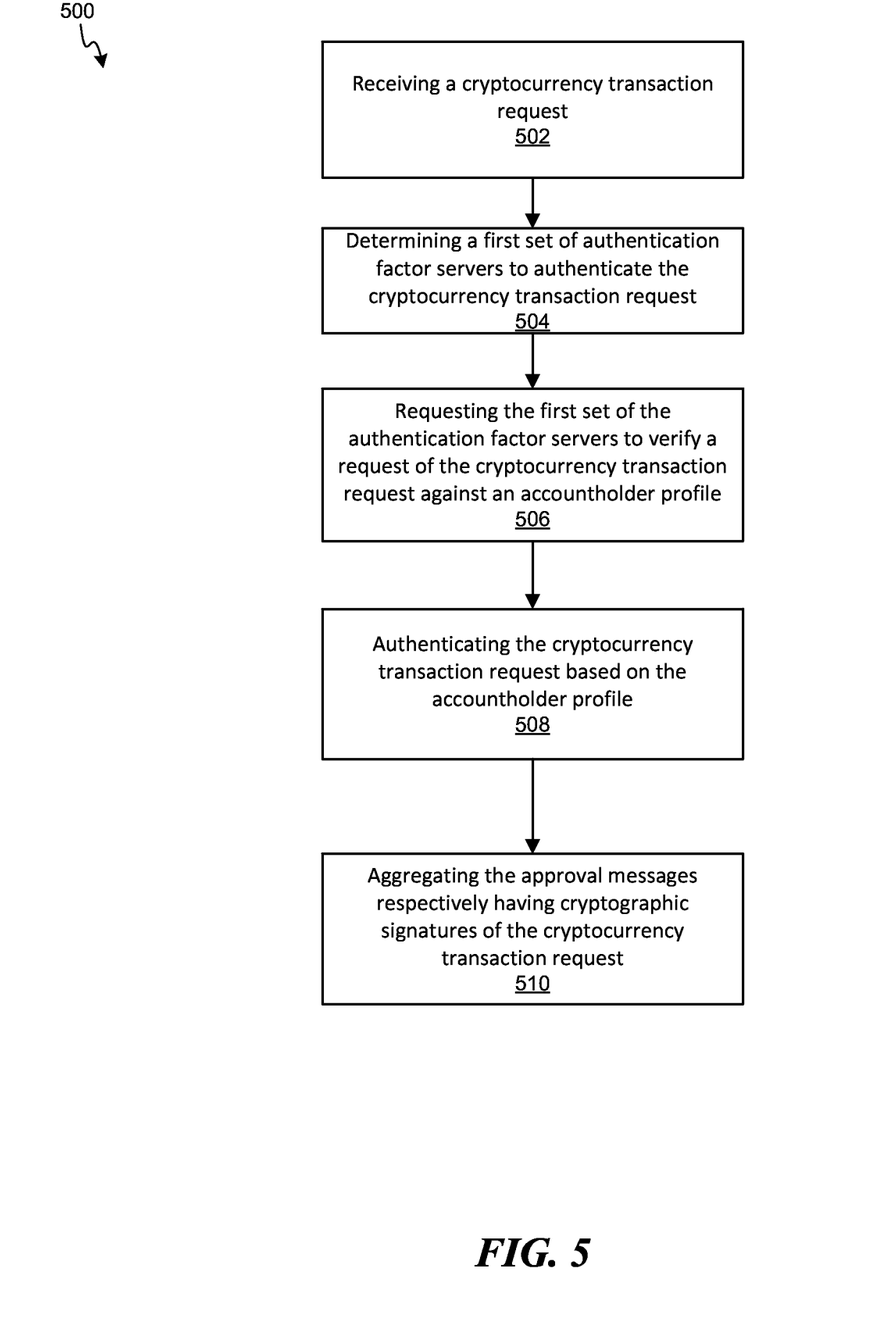
FIG. 5 is a flow chart of a computer-implemented method of operating a hot wallet service system, in accordance with various embodiments.

FIG. 5 is a flow chart of a computer-implemented method 500 of operating a hot wallet service system (e.g., the hot wallet service 200 of FIG. 2), in accordance with various embodiments. The method 500 can include a manager server (e.g., the authenticator manager 208 of FIG. 2) receiving a cryptocurrency transaction request from a front-end server (e.g., the web server 204 of FIG. 2) that interfaces with a requestor user device, the cryptocurrency transaction request identifying at least a hot wallet accountholder identifier in step 502.

Then in step 504, the manager server determines a first set of authentication factor servers (e.g., all or a subset of the multiple authentication factor servers 210 of FIG. 2) to authenticate the cryptocurrency transaction request, each authentication factor server utilizing a different authentication factor. For example, the manager server may rotate through different sets of authentication factor servers or use the same authentication factor servers for all transactions. For another example, the manager server can determine the first set of the authentication factor servers based on an attribute of the cryptocurrency transaction request or the accountholder profile. In step 506, the manager server requests the first set of the authentication factor servers to verify a requester of the cryptocurrency transaction request against an accountholder profile associated with the hot wallet accountholder identifier.

Then in step 508, the authentication factor servers, operating independently of each other, authenticate the cryptocurrency transaction request based on the accountholder profile. This step includes the authentication factor servers independently approving the cryptocurrency transaction request by cryptographically signing approval messages with respective private authentication keys of the authentication factor servers. Each of the authentication factor servers approves and signs when the requester is verified against the accountholder profile. When authenticating, the authentication factor servers can receive responses to authentication requests indirectly through the front-end server and the manager server.

In some embodiments, each of the authentication factor servers stores a portion of the accountholder profile associated with the hot wallet accountholder identifier. For example, each authentication factor server can authenticate by verifying the requestor against the portion of the accountholder profile in the authentication factor server. In some embodiments, the manager server or the front-end server stores the accountholder profile. For example, step 506 can include the manager server providing the accountholder profile to the first set of the authentication factor servers.

Each authentication factor server can implement a different authentication factor. For instance, one of the authentication factor servers can verify that the requester is in possession of a communication device other than the requestor user device. For another instance, one of the authentication factor servers can send a biometric verification request to a communication device, other than the requestor user device, associated with the hot wallet accountholder identifier. The authentication factor server can also request a third-party service to authenticate the requester against the accountholder profile. For yet another instance, one of the authentication factor servers can verify that the requester is knowledgeable of a passcode or one or more answers to one or more questions.

In step 510, an aggregation server (e.g., the signature aggregator 212 of FIG. 2) receives and aggregates the approval messages respectively having cryptographic signatures of the cryptocurrency transaction request from the authentication factor servers in order to publish the cryptocurrency transaction request into a cryptocurrency network. Step 510 may include the aggregation server determining an approval ratio of the authentication factor servers in the first set that have cryptographically signed the approval messages to the aggregation server. In response, the aggregation server cryptographically signs a transaction broadcast message based on the cryptocurrency transaction request when the approval ratio is above a ratio threshold. The ratio threshold may be determined (e.g., by the aggregation server) based on a suspicion level of the requestor user device or the accountholder profile or an attribute (e.g., transaction type, transaction amount, destination address, etc.) of the cryptocurrency transaction request.

The aggregation server can generate the transaction broadcast message based on the cryptocurrency transaction request, in response to receiving the cryptographic signatures. The transaction broadcast message may specify at least a public destination address and one or more cryptocurrency source addresses to draw value from. The one or more cryptocurrency source addresses can be selected from a shared pool of cryptocurrency addresses available to multiple accountholders in the hot wallet service system or a private pool of cryptocurrency addresses available to the hot wallet accountholder identifier. The transaction broadcast message is signed with private cryptocurrency keys corresponding to the one or more cryptocurrency source addresses. Step 510 may further include the aggregation server providing the transaction broadcast message to one or more computer nodes in the cryptocurrency network.

Figure 6:
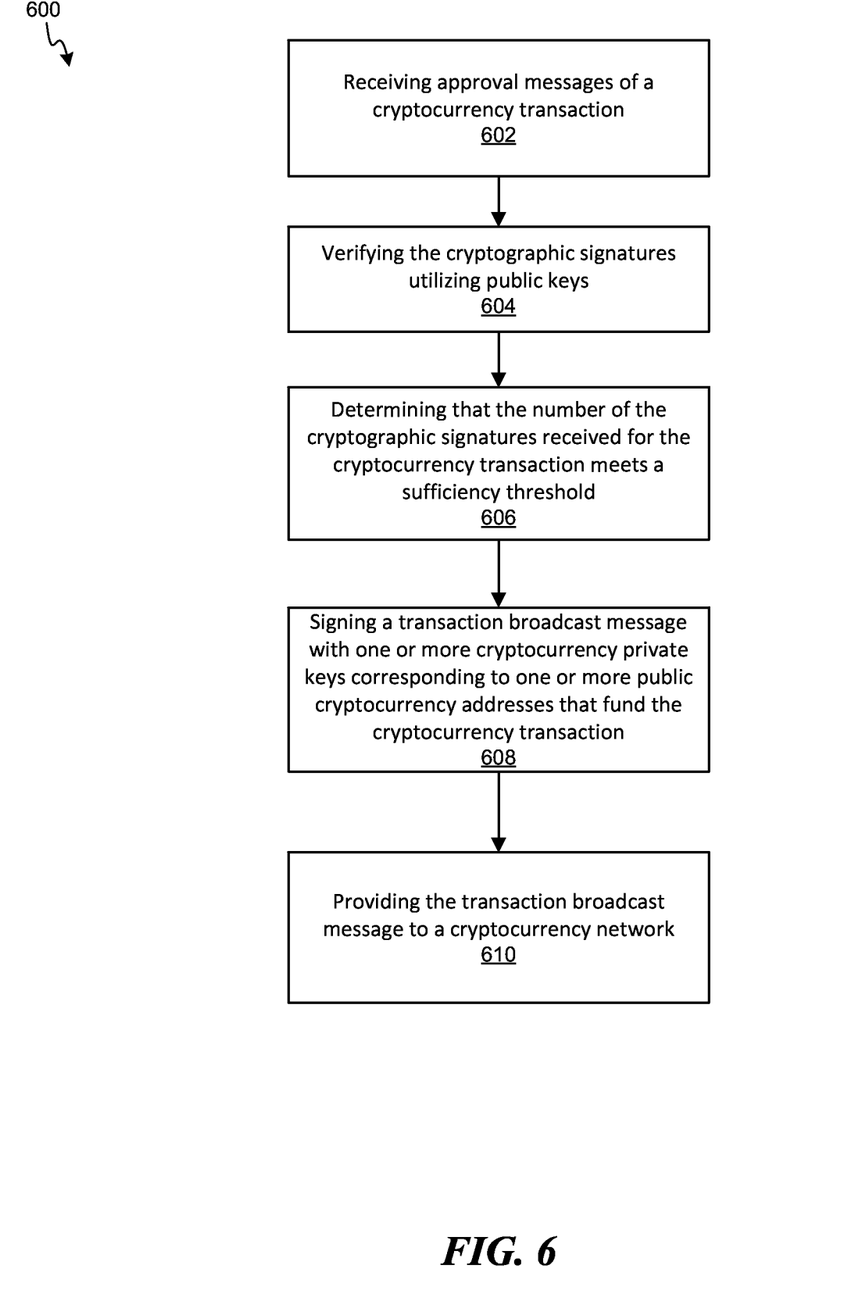
FIG. 6 is a flow chart of a computer-implemented method of operating a cryptocurrency network interface server in a hot wallet service system, in accordance with various embodiments.

FIG. 6 is a flow chart of a computer-implemented method 600 of operating a cryptocurrency network interface server (e.g., the signature aggregator 212 of FIG. 2) in a hot wallet service system (e.g., the hot wallet service 200 of FIG. 2), in accordance with various embodiments. The method 600 may be consistent with the method 500, including step 510 of FIG. 5. The method 600 may include step 602 of the cryptocurrency network interface server receiving approval messages of a cryptocurrency transaction independently from multiple authentication servers that independently verify a requester is authorized to initiate the cryptocurrency transaction. The approval messages have separate and different cryptographic signatures generated at the multiple authentication servers based on different private keys stored respectively therein.

In step 604, the cryptocurrency network interface server then verifies the cryptographic signatures utilizing public keys corresponding to the private keys. In response in step 606, the cryptocurrency network interface server determines that the number of the cryptographic signatures received for the cryptocurrency transaction meets a sufficiency threshold.

When the number of the cryptographic signatures meets the sufficiency threshold and when the cryptographic signatures are verified, the cryptocurrency network interface server signs a transaction broadcast message with one or more cryptocurrency private keys in step 608. The one or more cryptocurrency private keys correspond to one or more public cryptocurrency addresses that fund the cryptocurrency transaction. The one or more public cryptocurrency addresses may be selected from a private pool of cryptocurrency addresses associated with a specific hot wallet account that initiated the cryptocurrency transaction. Alternatively, the one or more public cryptocurrency addresses may be selected from a shared pool of cryptocurrency addresses available to multiple accountholders in the hot wallet service system. Then in step 610, the cryptocurrency network interface server provides the transaction broadcast message to a cryptocurrency network to propagate the cryptocurrency transaction.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Some embodiments of the disclosure have other aspects, elements, features, and steps in addition to or in place of what is described above. These potential additions and replacements are described throughout the rest of the specification.

What is claimed is:

1. A computer-implemented method of operating a hot wallet service system, comprising:

receiving, by a manager server, a cryptocurrency transaction request from a front-end server communicatively coupled with a requester user device, the cryptocurrency transaction request identifying at least a hot wallet accountholder identifier;

determining, at the manager server, a first set of authentication factor servers based on an evaluation of the cryptocurrency transaction request using a policy configuration;

assigning, by the manager server, a different authentication factor of authentication of the cryptocurrency transaction request to each authentication factor server of the first set of authentication factor servers uses;

verifying, by the first set of the authentication factor servers, a requester of the cryptocurrency transaction request against an accountholder profile associated with the hot wallet accountholder identifier by sending a verification code to the accountholder device via text message and receiving the verification code from a web server;

authenticating, via the authentication factor servers operating independently of each other, the cryptocurrency transaction request based on the accountholder profile, wherein authenticating the cryptocurrency transaction request includes the authentication factor servers independently approving the cryptocurrency transaction request by cryptographically signing approval messages with respective private authentication keys of the authentication factor servers, each of the authentication factor servers approving based on a requester verification; and aggregating, via the aggregation server, the approval messages respectively having cryptographic signatures of the cryptocurrency transaction request from the authentication factor servers and publishing the cryptocurrency transaction request into a cryptocurrency network.

2. The computer-implemented method of claim 1, wherein aggregating the approval messages includes:

receiving the cryptographic signatures;

in response to receiving the cryptographic signatures, generating a transaction broadcast message based on the cryptocurrency transaction request, the transaction broadcast message specifying at least a public destination address and one or more cryptocurrency source addresses to draw value from, wherein the one or more cryptocurrency source addresses are of a shared pool of cryptocurrency addresses available to multiple accountholders in the hot wallet service system and wherein the transaction broadcast message includes a first cryptographic signature with private cryptocurrency keys corresponding to the one or more cryptocurrency source addresses;

providing the transaction broadcast message to one or more computer nodes in the cryptocurrency network.

3. The computer-implemented method of claim 1, wherein aggregating the approval messages includes:

receiving the cryptographic signatures;

in response to receiving the cryptographic signatures, generating a transaction broadcast message based on the cryptocurrency transaction request, the transaction broadcast message specifying at least a public destination address and one or more cryptocurrency source addresses to draw value from, wherein the one or more cryptocurrency source addresses are selected from a private pool of cryptocurrency addresses available to the hot wallet accountholder identifier and wherein the transaction broadcast message is signed with private cryptocurrency keys corresponding to the one or more cryptocurrency source addresses;

providing the transaction broadcast message to one or more computer nodes in the cryptocurrency network.

4. The computer-implemented method of claim 1, wherein each of the authentication factor servers, include in storage, a portion of the accountholder profile, associated with the hot wallet accountholder identifier, and wherein authenticating includes authenticating via one of the authentication factor servers by verifying the requestor against the portion of the accountholder profile in the one authentication factor server.

5. The computer-implemented method of claim 1, wherein the manager server or the front-end server stores the accountholder profile, and requesting the authentication factor servers includes providing the accountholder profile to the first set of the authentication factor servers.

6. The computer-implemented method of claim 1, wherein authenticating includes verifying, via one of the authentication factor servers, that the requester is in possession of a communication device other than the requestor user device.

7. The computer-implemented method of claim 1, wherein authenticating includes verifying, via one of the authentication factor servers, that the requester is knowledgeable of a passcode or one or more answers to one or more questions.

8. The computer-implemented method of claim 1, wherein authenticating includes sending, via one of the authentication factor servers, a biometric verification request to a communication device, other than the requestor user device, associated with the hot wallet accountholder identifier.

9. The computer-implemented method of claim 1, wherein authenticating includes requesting, via one of the authentication factor servers, a third-party service to authenticate the requester against the accountholder profile.

10. The computer-implemented method of claim 1, wherein authenticating, via the authentication factor servers, includes receiving responses to authentication requests indirectly through the front-end server and the manager server.

11. The computer-implemented method of claim 1, wherein aggregating the cryptographic signatures includes:

determining an approval ratio of the authentication factor servers in the first set that have cryptographically signed the approval messages to the aggregation server; and cryptographically signing a transaction broadcast message based on the cryptocurrency transaction request when the approval ratio is above a ratio threshold.

12. The computer-implemented method of claim 11, wherein aggregating further includes determining the ratio threshold based on a suspicion level of the requestor user device or the accountholder profile.

13. The computer-implemented method of claim 11, wherein determining the ratio threshold is based on an attribute of the cryptocurrency transaction request.

14. The computer-implemented method of claim 1, wherein determining the first set of the authentication factor servers is based on an attribute of the cryptocurrency transaction request or the accountholder profile.

15. A hot wallet computer system comprising:

a manager server configured to receive a cryptocurrency transaction request identifying at least a hot wallet accountholder identifier and to determine a first set of authentication factor servers to authenticate the cryptocurrency transaction request based on an evaluation of the cryptocurrency transaction request using a policy configuration;

the authentication factor servers, each configured to independently authenticate the cryptocurrency transaction request by verifying a requester of the cryptocurrency transaction request against an accountholder profile associated with the hot wallet accountholder identifier by sending a verification code to the accountholder device via text message and receiving the verification code from a web server;

wherein the authentication factor servers are configured to approve, independently from each other, the cryptocurrency transaction request by cryptographically signing approval messages and to send to an aggregation server using respective private authentication keys stored respectively in the authentication factor servers when the requester is verified; and the aggregation server configured to aggregate cryptographic signatures of the cryptocurrency transaction request from the authentication factor servers and to publish the cryptocurrency transaction request into a cryptocurrency network.

16. The hot wallet computer system of claim 15, further comprising: a front-end server configured to interface with a requestor user device and to initiate the cryptocurrency transaction request based on interactions with the requestor device.

17. The hot wallet computer system of claim 15, wherein the aggregation server is further configured to:

verify the cryptographic signatures utilizing public keys corresponding to the private authentication keys respectively used by the authentication factor servers to generate the cryptographic signatures;

determine that a number of the cryptographic signatures meets a sufficiency threshold;

sign a transaction broadcast message with one or more cryptocurrency private keys corresponding to one or more public cryptocurrency addresses that fund the cryptocurrency transaction request when the number of the cryptographic signatures meets the sufficiency threshold and when the cryptographic signatures are verified; and provide the transaction broadcast message to one or more computing nodes of the cryptocurrency network to propagate the cryptocurrency transaction request.

* * * * *